Patented Mar. 14, 1950

2,500,761

UNITED STATES PATENT OFFICE 2,500,761

PREPARATION OF ORGANO-SUBSTITUTED HALOGENOSILANES

Richard N. Lewis, Schenectady, N. Y., assignor to General Electric Company, a corporation of New York No Drawing. Application June 19, 1947, Serial No. 755,737

15 Claims. (Cl. 260—448.2)

This invention is concerned with the preparation or organo-substituted halogenosilanes from organo-substituted polysiloxanes. More particularly, the invention is concerned with a process for preparing an organo-substituted halogenosilane, which process comprises effecting reaction between an organo-substituted polysiloxane and a thionyl halide in the presence of a catalyst for the reaction, thereby to obtain a reaction product containing the said organo-substituted halogenosilane.

It was known heretofore that chlorination of hexamethyl disoloxane resulted in the formation of an aqueous phase indicating the reversal of the hydrolysis of trimethylchlorosilane. [J. A. C. S. 68, 2291 (1946).]

The reversal is not complete and is not a useful method for preparing trimethylchlorosilane.

I have now discovered that I can prepare organo-substituted halogenosilanes, in many cases in almost quantitative yields, from organo-substituted polysiloxanes by effecting reaction between the organo-substituted polysiloxane and a thionyl halide in the presence of a catalyst for the reaction, preferably selected from the class consisting of hydrogen halides, Friedel-Crafts type catalysts, and hydrates of Friedel-Crafts type catalysts.

One of the advantages of my process lies in the fact that, due to the disappearance of the thionyl halide by reaction with the halogenosilane, and as a result of the evolution of $SO_2$ during the course of the reaction, it is possible to obtain a reaction product which contains relatively small amounts of liquid other than the organo-substituted halogenosilane and any residual starting organo-substituted polysiloxane. This permits relatively easy isolation of the organo-substituted halogenosilane from the reaction mass.

As far as I am able to ascertain, there is no perceptible reaction between the organo-substituted polysiloxane and the thionyl halide in the absence of a catalyst for the reaction. Optimum results are obtained when the organo-substituted polysiloxane and the thionyl halide are caused to react in the presence of a metal halide and a hydrogen halide, which hydrogen halide may be released in the reaction mixture, e. g., as a result of the reaction between the thionyl halide and the hydrate of the metal halide.

The temperature ranges within which my process may be carried out are not critical. At room temperatures or lower, the reaction goes to completion in relatively longer times than at elevated temperatures. The temperature employed will depend on such factors as, for instance, the particular organo-substituted polysiloxane and thionyl halide employed, the catalyst used, etc. I have found that temperatures of the order of from about 0° C. to about 200° C. are advantageously employed.

It will be understood by those skilled in the art, that subatmospheric or superatmospheric pressures may be employed without departing from the scope of my claimed invention. Although I prefer to use atmospheric (i. e., normal) pressures, it will be evident that where some of the ingredients in the reaction mass, for example, the thionyl halide or catalyst, are gases at room temperatures and pressures, the reaction is advantageously conducted under pressure in suitable reactors.

The liquid organo-substituted polysiloxanes capable of being converted to organo-substituted halogenosilanes in accordance with the practice of my invention, contain organic radicals, for example, hydrocarbon radicals, attached to silicon by C—Si linkages, which silicon atoms are joined to other silicon atoms by oxygen atoms as, for instance, Si—O—Si. These compounds may be prepared either by hydrolysis of hydrolyzable organosilanes and condensation of the hydrolyzed products, or by hydrolysis of a mixture of different hydrolyzable organo-substituted silicon compounds and co-condensation of the hydrolysis products.

By hydrolyzable organosilanes I mean derivatives of $SiH_4$ which contain readily hydrolyzable radicals such as hydrogen, halogens, amino groups, alkoxy, aroxy, and acyloxy radicals, etc., the remaining valences of the silicon atoms being satisfied by organic radicals that are joined to the silicon atoms through carbon atoms. Examples of such organic radicals are as follows: Lower alkyl radicals, for example, methyl, ethyl, propyl, isopropyl, butyl, etc.; higher alkyl radicals, for example, hexyl heptyl, octyl, etc.; alicyclic radicals, for example, cyclopentyl, cyclohexyl, etc.; aryl radicals, for example, phenyl, naphthyl etc.; alkaryl radicals, for example, tolyl, xylyl, etc.; aralkyl radicals, for example, benzyl, phenylethyl, etc. The above radicals if desired, may also contain inorganic substituents, for example, halogens, etc.

I have found that my reaction is particularly effective in the case of liquid, oily, non-resinous organo-substituted polysiloxanes wherein the average number of organic radicals joined to each silicon atom in the polysiloxane chain is present in an amount equal to from about 1.95 to 3, more particularly, from 1.98 to 3, organic radicals per silicon atom, especially where from 95 to 100% of the silicon atoms have at least two organic substituents attached thereto.

More specific methods for preparing the aforementioned liquid organopolysiloxanes, including the liquid oily, non-resinous methyl polysiloxanes (e. g., liquid, polymeric methyl silicones) may be found, for instance, in the copending applications of Winton I. Patnode, Serial Nos. 463,813, now abandoned, 486,814, now U. S. Patent 2,469,888, and 463,815, now abandoned, all of which applications were filed October 29, 1942, and Wilcock application Serial No. 656,162, now U. S. Patent 2,491,843, and Sauer applications Serial Nos. 656,163, and 656,164, filed March 21, 1946. All the foregoing applications have been assigned to the same assignee as the present invention. Hyde Patent 2,377,689, issued June 5, 1945, also discloses additional methods for the preparation as well as the properties of various liquid organopolysiloxanes which may be employed in the practice of the present invention.

The term "liquid methyl polysiloxane" includes, for example, (1) compositions comprised substantially of a mixture consisting of liquid polymeric dimethyl silicones represented by the formula $[(CH_3)_2SiO]_x$ of average molecular weight such that $x$ in said formula is at least 10 (see application Serial No. 463,815, supra), (2) liquid methyl polysiloxanes having the general formula

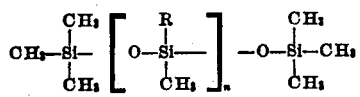

wherein R represents either a lower alkyl radical, e. g., a methyl radical, or an aryl radical, for instance, phenyl, etc., and $n$ stands for a positive integer, and (3) liquid methyl polysiloxanes in which an average of from 2 to 3 methyl groups are attached to all or substantially all of the silicon atoms.

Among the thionyl halides which may be employed in my invention are, for example, thionyl chloride, thionyl bromide, thionyl fluoride, thionyl chlorobromide (SOClBr), etc. These compounds may be represented by the general formula $SOX'X''$ where $X'$ and $X''$ are each a halogen. Preferably, the halogens are the same; thus, the general formula $SOX_2$ represents a thionyl halide where X is halogen, e. g., chlorine, bromide, fluorine, etc. Examples of catalysts which may be employed in my claimed process are hydrogen chloride, hydrogen fluoride, hydrogen bromide, etc; halides of iron, for example, ferric chloride, ferrous chloride, ferric bromide, ferric fluoride, etc.; hydrates of iron halides, for example, $FeCl_3 \cdot 6H_2O$, $FeCl_2 \cdot 4H_2O$, $FeF_3 \cdot 4\frac{1}{2}H_2O$, $FeBr_2 \cdot 6H_2O$, etc.; halides of aluminum and their hydrates, for example, $AlCl_3$, $AlCl_3 \cdot 6H_2O$, etc.; halides of zinc, for example, zinc chloride, zinc bromide, hydrates of zinc halides, e. g., $ZnCl_2 \cdot H_2O$, etc.; halides of tin, e. g., stannic chloride, stannous chloride, etc.; boron halides, e. g., $BF_3$, etherates of $BF_3$, etc.

The time within which the reaction is effected is not critical. I have found that when the reaction mass is heated to its reflux temperature, in the presence of the catalysts mentioned above, the reaction is substantially completed within from 10 to 120 minutes. Usually the end of the reaction can be determined by noting whether there is any further evolution of $SO_2$ from the reaction mass.

In order that those skilled in the art may better understand how the present invention may be practiced, the following examples are given by way of illustration and not by way of limitation. All parts are by weight.

*Example 1*

|  | Parts | Approximate Molar Ratio |
|---|---|---|
| Hexamethyl disiloxane | 38.1 | 1 |
| Thionyl Chloride | 52.5 | 2 |

The above ingredients were mixed together in a flask fitted with an inlet tube for HCl and an ice water condenser, the outlet of which was connected to a second flask fitted with a low temperature (solid $CO_2$ and acetone) condenser. HCl was passed from a cylinder into the reaction mixture for 16 hours until approximately 10 parts $SO_2$ collected in the second flask. Fractional distillation of the reaction product yielded about 41.3 parts (81% of theoretical) trimethylchlorosilane and a small amount of $SOCl_2$. There was no trace of hexamethyl disiloxane.

*Example 2*

|  | Parts | Approximate Molar Ratio |
|---|---|---|
| Hexamethyl disiloxane | 76.0 | 1 |
| Thionyl chloride | 82.8 | 1.5 |
| Ferric chloride hexahydrate ($FeCl_3 \cdot 6H_2O$) | 5.0 |  |

The above ingredients were mixed together in a reaction flask and the mass heated gently at its reflux temperature for about 15 minutes. At the end of this time, when the evolution of $SO_2$ had ceased, another 5 parts of $FeCl_3 \cdot 6H_2O$ was added and the mixture again heated for 15 minutes. Distillation of the reaction product showed it contained about 100 parts trimethylchlorosilane.

*Example 3*

|  | Parts | Approximate Molar Ratio |
|---|---|---|
| Hexamethyl disiloxane | 152.0 | 1 |
| Thionyl Chloride | 165.6 | 1.5 |
| Ferric Chloride (anhydrous) | 1.0 |  |

The above ingredients were mixed together and heated in a flask at the reflux temperature of the mass for about 20 minutes. At the end of this time, on distillation of the reaction product, it was found that substantially all the hexamethyl disiloxane was converted to trimethylchlorosilane.

*Example 4*

When about 10 parts of a liquid, oily non-resinous dimethyl-substituted polysiloxane containing an average of about 2 methyl groups per silicon atom (obtained by the hydrolysis of dimethyldichlorosilane) was heated with 24.8 parts thionyl chloride in the presence of 2 parts $FeCl_3 \cdot 6H_2O$ for 80 minutes, there was obtained a substantial amount of dimethyldichlorosilane.

*Example 5*

In this example, a mixture comprising approximately 5 parts tetramethyldiphenyldisiloxane, 8.3 parts thionyl chloride, and 0.3 part FeCl$_3$·6H$_2$O
was heated at its reflux temperature for 45 minutes. Distillation of the reaction product disclosed the presence of a substantial amount of dimethylphenylchlorosilane [(CH$_3$)$_2$C$_6$H$_5$SiCl].

It will, of course, be apparent to those skilled in the art that other organo-substituted polysiloxanes, thionyl halides, and catalysts, in addition to the ones employed in the foregoing examples, may be used in practicing my invention. Many examples of these various ingredients have been given previously. It is also to be understood that the amount of catalyst employed is not critical. However, I prefer to use from about 0.1 to 10, preferably from about 1 to 6, percent, by weight, of the catalyst, based on the weight of the organo-substituted polysiloxane.

The proportion of thionyl halide to organo-substituted polysiloxane present in the reaction mixture is advantageously present in a molar excess in order to obtain optimum yields of the organo-substituted halogenosilane. I have found that on a molar basis, from 1 to 3 or more mols of the thionyl halide are advantageously employed for each gram atom of oxygen in the organo-substituted polysiloxane.

What I claim as new and desire to secure by Letters Patent of the United States is:

1. A process for preparing an organo-substituted halogenosilane which comprises treating a liquid organopolysiloxane wherein the organic groups are connected directly to silicon atoms through C—Si linkages, the said organic groups being selected from the class consisting of alkyl, aryl, aralkyl, and alkaryl radicals, with a thionly halide in the presence of a catalyst for the reaction selected from the class consisting of (1) hydrogen halides, (2) halides of iron, boron, zinc and tin, and (3) hydrates of the metal halides disclosed in (2), thereby to obtain a reaction product containing the said organo-substituted halogenosilane.

2. A process for preparing an organo-substituted chlorosilane which comprises treating a liquid organopolysiloxane wherein the organic groups are connected directly to silicon atoms through C—Si linkages, the said organic groups being selected from the class consisting of alkyl, aryl, alkaryl and aralkyl radicals, with thionyl chloride in the presence of a catalyst for the reaction selected from the class consisting of (1) hydrogen halides, (2) halides of iron, boron, zinc and tin, and (3) hydrates of the metal halides disclosed in (2), thereby to obtain a reaction product containing the said organo-substituted chlorosilane.

3. A process for preparing a hydrocarbon-substituted halogenosilane which comprises heating, in the presence of a hydrogen halide, a mixture comprising a liquid hydrocarbon-substituted polysiloxane wherein the hydrocarbon groups are connected directly to silicon atoms by C—Si linkages, the aforesaid hydrocarbon groups being selected from the class consisting of alkyl, aryl, alkaryl, and aralkyl radicals, and a thionyl halide, and isolating the formed hydrocarbon-substituted halogenosilane.

4. A process for preparing a hydrocarbon-substituted halogenosilane which comprises heating, in the presence of an iron halide, a mixture comprising a liquid hydrocarbon-substituted polysiloxane wherein the hydrocarbon groups are connected directly to silicon atoms by C—Si linkages, the aforesaid hydrocarbon groups being selected from the class consisting of alkyl, aryl, alkaryl, and aralkyl radicals, and a thionyl halide, and isolating the formed hydrocarbon-substituted halogenosilane.

5. A process for preparing a methyl-substituted halogenosilane which comprises heating, in the presence of a hydrogen halide, a mixture comprising a liquid methylpolysiloxane wherein the methyl groups are attached directly to the silicon atoms by C—Si linkages, and a thionyl halide, and isolating the formed methyl-substituted halogenosilane.

6. A process for preparing a hydrocarbon-substituted chlorosilane which comprises heating, in the presence of a hydrogen halide, a mixture comprising a liquid hydrocarbon-substituted polysiloxane wherein the hydrocarbon groups are connected directly to silicon atoms by C—Si linkages, the aforesaid hydrocarbon groups being selected from the class consisting of alkyl, aryl, alkaryl, and aralkyl radicals, and thionyl chloride, and isolating the formed hydrocarbon-substituted chlorosilane.

7. A process for preparing a hydrocarbon-substituted chlorosilane which comprises heating, in the presence of an iron halide, a mixture comprising a liquid hydrocarbon-substituted polysiloxane wherein the hydrocarbon groups are connected directly to silicon atoms by C—Si linkages, the aforesaid hydrocarbon groups being selected from the class consisting of alkyl, aryl, alkaryl, and aralkyl radicals, and thionyl chloride, and isolating the formed hydrocarbon-substituted chlorosilane.

8. A process for preparing a methyl-substituted chlorosilane which comprises heating, in the presence of a hydrogen halide, a mixture comprising a liquid methylpolysiloxane wherein the methyl groups are attached directly to the silicon atoms by C—Si linkages, the said methylpolysiloxane having an average of from 1.98 to 3 methyl groups substituted on each silicon atom, and thionyl chloride, and isolating the formed methyl-substituted chlorosilane.

9. A process for preparing a methyl-substituted chlorosilane which comprises heating, in the presence of an iron halide, a mixture comprising a liquid methylpolysiloxane wherein the methyl groups are attached directly to the silicon atoms by C—Si linkages, and thionyl chloride, and isolating the formed methyl-substituted chloro-silane.

10. A process for preparing a methylchlorosilane which comprises treating a liquid methylpolysiloxane wherein the methyl groups are attached directly to the silicon atoms by C—Si linkages, with thionyl chloride in the presence of hydrogen chloride, and isolating the formed methylchlorosilane.

11. A process for preparing a methylchlorosilane which comprises heating a mixture comprising a liquid methylpolysiloxane wherein the methyl groups are attached directly to the silicon atoms by C—Si linkages, and thionyl chloride in the presence of an iron chloride, and isolating the formed methylchlorosilane.

12. The process as in claim 11 wherein the iron chloride is a hydrate of an iron chloride.

13. A process for preparing trimethylchlorosilane which comprises treating hexamethyl disiloxane with thionyl chloride in the presence of hydrogen chloride, and isolating the formed trimethylchlorosilane.

14. A process for preparing trimethylchlorosilane which comprises heating a mixture comprising hexamethyl disiloxane and thionyl chloride, in the presence of ferric chloride hexahydrate, and isolating the formed trimethylchlorosilane.

15. A process for preparing dimethyldichlorosilane which comprises treating a liquid methylpolysiloxane wherein the methyl groups are attached directly to the silicon atoms by C—Si linkages, the said methylpolysiloxane having an average of from 1.98 to 2 methyl groups substituted on each silicon atom, with thionyl chloride in the presence of ferric chloride hexahydrate, and isolating the formed dimethyldichlorosilane.

RICHARD N. LEWIS.

REFERENCES CITED

The following references are of record in the file of this patent:

Sommer et al., "Jour. Amer. Chem. Soc.," vol. 68 (1946), page 485.

Volnov, "Jour Gen. Chem.," U. S. S. R. (1940), vol. 10, pages 1600–1604.